July 24, 1951  A. R. PAULET ET AL  2,561,535
PHOTOGRAPHIC LIGHT CONTROL
Filed Dec. 5, 1947  2 Sheets-Sheet 1
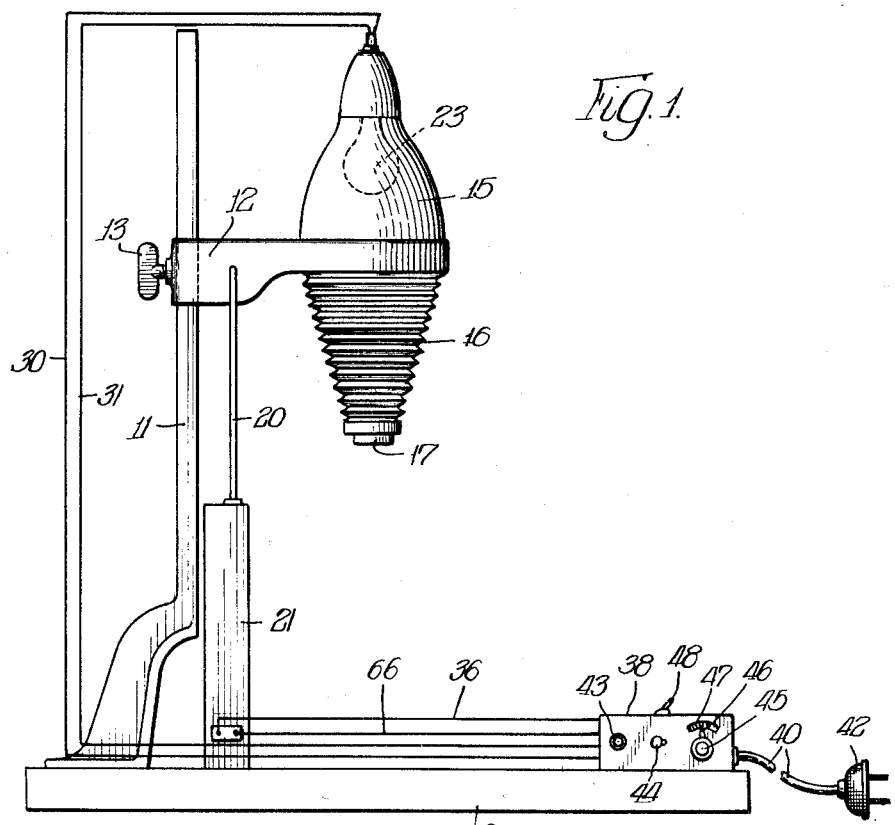
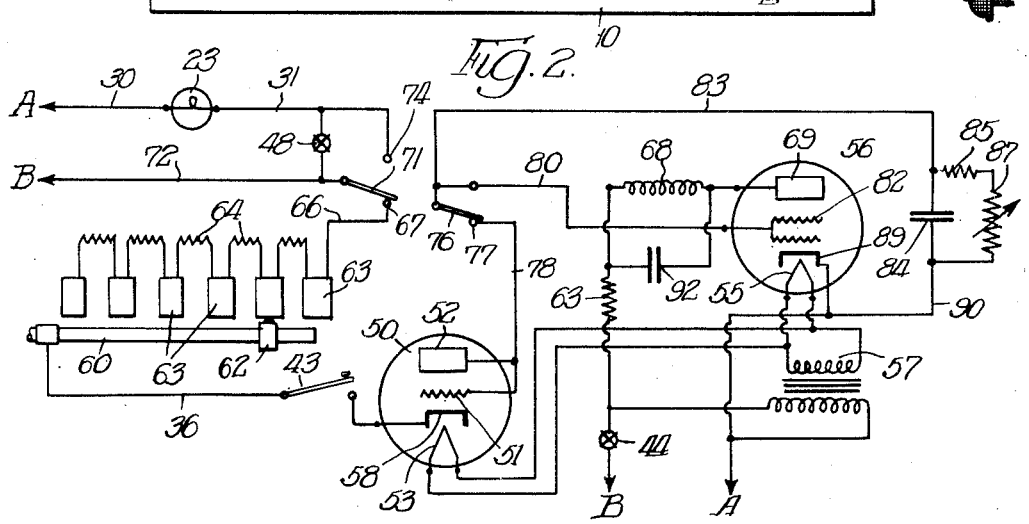
INVENTORS.
Armand R. Paulet,
BY Charles R. Wheeler, July 24, 1951   A. R. PAULET ET AL   2,561,535
PHOTOGRAPHIC LIGHT CONTROL
Filed Dec. 5, 1947   2 Sheets-Sheet 2
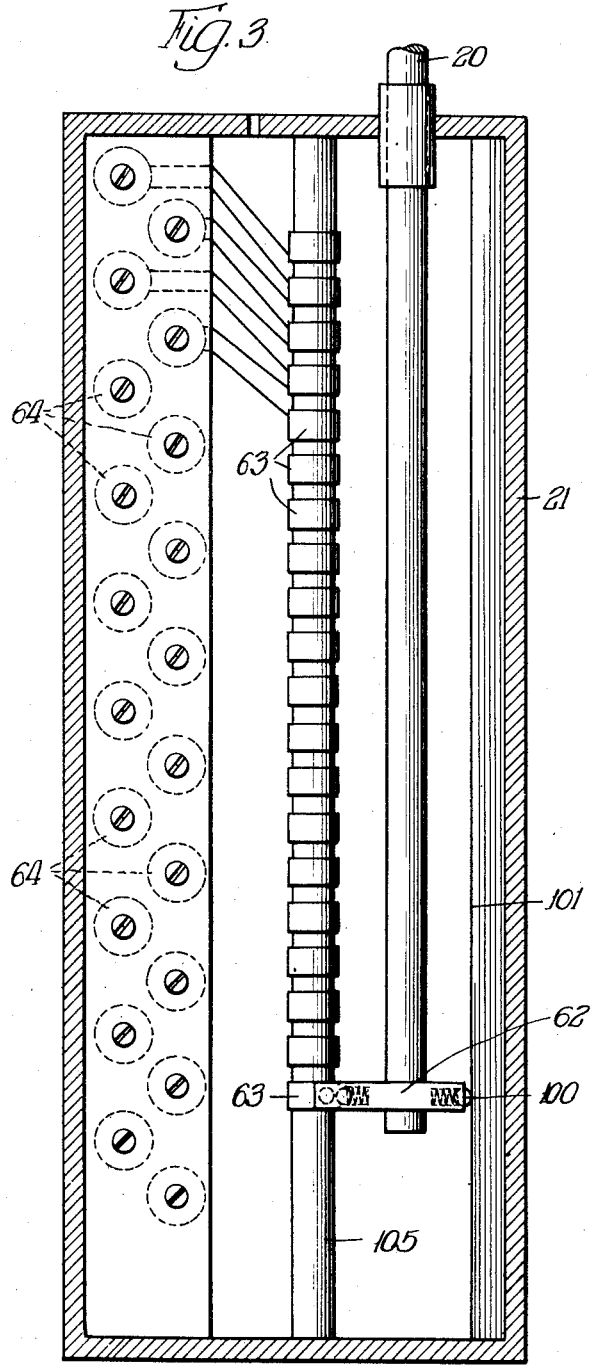
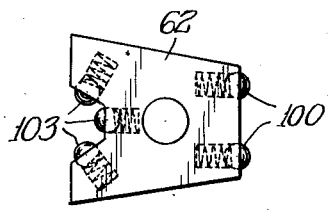
INVENTOR.
Armand R. Paulet,
BY Charles R. Wheeler, Patented July 24, 1951

2,561,535

UNITED STATES PATENT OFFICE 2,561,535

PHOTOGRAPHIC LIGHT CONTROL

Armand R. Paulet, Chicago, Ill., and Charles R. Wheeler, Elkhorn, Wis.

Application December 5, 1947, Serial No. 789,916

2 Claims. (Cl. 88—24)

1

This invention relates to a new and improved photographic enlarger timer and light control and more particularly to a construction in which the period of illumination is controlled in proportion to the distance of the light source from the sensitized material.

Very exact exposures have been found necessary in different steps of the various processes for the production of color photographs and our apparatus is especially adapted for such purposes, though it will be understood that it is also useful in connection with black and white photography.

Apparatus for the automatic timing of photographic exposures by means of electronic means, including controlled charge and discharge of a condenser, has been heretofore used. Such apparatus, however, does not take into account differences in intensity of illumination with an enlarger when the enlarger head is moved toward or away from the support for the light sensitive material upon which the print is being made. While such timers will accurately control printing time, it is necessary to compute that time or to take it from tables for different amounts of magnification. Thus, when a picture is made from a negative or transparency upon a given size of printing paper or other material and it is desired to crop individual pictures to different amounts, it is necessary to first adjust and focus the enlarger and then determine the amount of magnification in use and finally to determine the necessary printing time.

The control apparatus of the present invention includes automatically operating means for varying the timing in accordance with the amount of magnification and, consequently, in accordance with the amount of effective illumination on the light sensitive material.

It is an object of the present invention to provide a new and improved timing control.

It is a further object to provide such a control in which means are provided for varying the timing independently of the normal time set device.

It is an additional object to provide a construction adapted for use with an enlarger to automatically compensate for variations in illumination due to variation in the distance of the light source from the printing surface.

It is also an object to provide apparatus which is simple in operation and adapted for the use of unskilled personnel.

Other and further objects will appear as the description proceeds.

2

We have shown certain preferred embodiments of the invention in the drawings, in which—

Figure 1 is an elevation of the apparatus applied to a conventional enlarger;

Figure 2 is a schematic circuit diagram;

Figure 3 is a vertical section through the attenuator variable resistance; and

Figure 4 is a plan view of the contact member of the resistance of Figure 3.

Referring first to Figure 1, the enlarger is shown as having a base 10, a standard 11 and an adjustable bracket 12 secured in adjusted position on standard 11 by means of set screw 13. The bracket 12 carries the lamp housing 15 and bellows 16, in the lower end of which is carried the enlarging lens 17. The attenuator control rod 20 has its upper end connected to the bracket 12 and extends downwardly into the housing of the attenuator 21. The lamp housing 15 contains the lamp 23, shown in broken lines, which is connected to the power line through wires 30 and 31. These wires 30 and 31 lead to the control housing 38. The attenuator 21 is connected by wires 36 and 66 to the control housing 38. This housing 38 is provided with a double conductor cable 40 leading to a plug 42 which may be plugged into any source of current. The face of housing 38 carries a push-button switch 43 and a toggle switch 44. The housing also carries the knob 45 having a pointer 46 co-acting with scale 47. The top of housing 38 is shown as carrying a focusing switch 48.

The circuit diagram is shown in Figure 2. The vacuum tube 50 is shown as a triode with the grid 51 tied to the plate 52 so that it is diode connected. This may be a 6J5 tube or any suitable triode so connected, or a diode tube, since it serves solely as a rectifier. The heater filament 53 of this tube is connected in parallel with heater filament 55 of tube 56 and both are supplied by step-down transformer 57 which is connected across the A. C. line marked AB. Tube 56 is shown as a three element tube triode connected. A type 2050 tube is suitable, though many other types may be used.

The cathode 58 of tube 50 is connected to the push-button switch 43 which is connected through wire 36 to the rod 60 of the attenuator 21. This rod 60 carries the slider 62, adapted to engage the various contacts 63 to thus cut in or out the resistance sections 64 which are bridged across the contacts 63. The end contact 63 is connected by wire 66 to a fixed contact 67 which forms part of a double-throw switch actuated by the relay solenoid 68, which solenoid is shown as connected in the plate circuit of the vacuum tube 56. The movable contact 71 of the relay switch, which is shown as engaging contact 67, is connected to the B side of the 110 volt circuit through wire 72. The wire 31 connected to the A side of the 110 volt circuit terminates in contact 74, also adapted to be engaged by the movable contact 71.

The second movable contact 76 of the double-pole, double-throw relay switch is shown as engaging a contact 77 connected by wire 78 with the plate 52 of tube 50. The movable contact 76 is connected by line 80 with the grid 82 of tube 56 and by line 83 with the fixed condenser 84 and the fixed resistance 85. The variable resistance 87 is connected in series with the resistance 85, the two bypassing the condenser 84 and being joined to the cathode 89 of tube 56 by the line 90 which is also connected to the A side of the 110 volt line. The relay solenoid coil 68 has the fixed condenser 92 connected across it, and its side opposite to plate 69 is connected through the fixed resistance 93 to the B side of the 110 volt line.

The attenuator shown in detail in Figures 3 and 4 comprises the housing 21 and movable rod 20, this rod having the sliding contact member 62 secured in place adjacent its lower end. This member 62 is shown in detail in Figure 4 and has a plurality of ball contacts carried therein, these contacts being urged outwardly by springs, as shown. The ball contacts 100 on the flat side engage a flat guide member 101 in the housing. The three contacts 103 on the opposite face of member 62 engage the surfaces of the cylindrical contacts 63 which are carried by a rod 105 fixed in the housing. As shown diagrammatically in Figure 2, these fixed contacts 63 are connected to a plurality of resistance means 64 shown at the left of Figure 3. These resistances may take any usual form as, for example, resistance wire wound on bobbins. The values of resistance will depend on other circuit constants, but may be on the order of 10,000 ohms per bobbin.

In the use of the apparatus shown, it is assumed that the negative to be used or, in the event a color photograph is to be printed, the transparency to be used, is checked as to density on any suitable densitometer. A table is prepared showing the normal times of printing exposure for a negative or transparency through a wide range of densities. The exposure necessary will be computed for the particular source of illumination used in the enlarger and will be based on a normal magnification which may be taken at any predetermined amount. For example, it may be determined from the table that the particular negative or transparency has a density such that a normal magnification of 2 to 1 would require a printing time of twenty seconds. The scale 47, cooperating with the pointer 46 rotated by knob 45, will be calibrated to give exposures in accordance with the table when the bracket 12 is moved to such position that, with the lens in use, the projected image will have a magnification of 2. The pointer then is set at the twenty seconds, which is determined from the table as proper for the given density.

The enlarger head, with its lens and lamp, and carrying the negative or transparency, is moved up and down and the lens focused to give the desired result as to size upon the focusing surface. This movement moves the contact 62 of the attenuator along the series of contact 63 cutting in more or less resistance. When focusing has been completed, the sensitive material is placed upon the focusing surface and properly adjusted as to position.

If, then, the push-button 43 is depressed momentarily, the enlarger lamp will be illuminated and will automatically be extinguished at the termination of the desired printing time. This printing time will not be the twenty seconds for which the pointer 46 was set unless the enlargement should happen to be the basic enlargement for which the table was computed. The time will automatically be modified by the different amount of resistance cut in by the attenuator 21 if any other magnification within the range of the instrument is used.

The automatic control circuit is shown in Figure 2. This circuit comprises basically a condenser charging and discharging circuit, which is old in the art, for timing purposes. It is provided, however, with the additional variation of the timing due to the attenuator, which is a novel feature of the present construction.

The parts in Figure 2 are shown in the "off" position, with the enlarger lamp not lit. It will be understood that the movable contacts 71 and 76 are operated by the solenoid 68, comprising a double-pole, double-throw relay. In the position shown in Figure 2, the contacts are drawn down to the relay, as current is passing through tube 56 since, with the circuits connected as shown, the tube having a plate current flow sufficient to operate the relay. It will be understood that the main switch 44 has been turned to position to energize the circuit and to heat the cathodes 58 and 89 of tubes 50 and 56 by means of the heating circuit through transformer 57. With the circuit in this condition, the tube 50 is inoperative since its cathode 58 is disconnected.

In order to light the lamp for the desired operation, it is necessary to first adjust the pointer 46, as above described, to the indicated time on scale 47. This pointer controls the variable resistance 87 in Figure 2. After this adjustment is made and the focusing is taken care of, as previously described, the contact 62 will be moved so as to engage a fixed contact 63 cutting in some portion of the attenuator resistance. When the user is ready to make the exposure, the push-buttom 43 is depressed. As will be seen in Figure 2, this closes the cathode circuit of the tube 50, which tube is connected as a diode and, hence, operates as a rectifier of the alternating current. It will be noted that the plate 52 and grid 51, which are tied together, are connected through wire 78, contact 77, movable contact 76, wire 83, resistance 85, variable resistance 87 and wire 90 to the side B of the source of 110 volt current. The rectified current immediately passes from the plate through the circuit just described as far as the variable resistance 87 which, together with fixed resistance 85, is shunted around the condenser 84. It also passes through wire 80 to the grid 82 of tube 56. This negative charge at once swings the grid 82 negative so that the grid serves to cut off the tube. This occurs substantially instantaneously as the push-buttom 43 is depressed and released.

Current then does not flow through the plate-cathode circuit and the solenoid coil 68 is de-energized. This permits the movable contacts 71 and 76 to swing away from the contacts 67 and 77 and the movable contact 71 engages contact 74. Thus, the enlarger lamp 23 is lit. With the cathode circuit of the tube 50 broken by release of the push-button 43, the tube 50 is inoperative and the grid 82 and condenser 84 are no longer connected to a source of negative potential. The charge on condenser 84, however, continues for a period to hold the grid 82 negative. This charge gradually leaks off through fixed resistance 85 and variable resistance 87. The time required for this leakage is dependent on the adjustment of the variable resistance 87 by means of the knob 45. When the charge on condenser 84 has leaked off to such a point that the negative grid bias on 82 drops below "cut-off," the current again flows in the plate-cathode circuit and the relay 68 pulls down the movable contacts 71 and 76 which return to the position shown in Figure 2. This opens the circuit to lamp 23 and cuts off the illumination of the enlarger, terminating the exposure.

It will be apparent that the resistance of the attenuator 21, which is in the cathode circuit of tube 50 during the period of charging the condenser 84, has an effect on the character of that charge. Thus, the timing of the enlarger exposure, which is controlled as to leakage time by the variable resistance 87, is controlled as to the character of the charge by the resistance in the attenuator. Therefore, these two independent controls serve to interact so that the actual exposure time is determined by a combination of the effects of the attenuator resistor on the charging of the condenser and the leakage resistor on the discharging of the condenser.

An important feature of the circuit is that the tube 50 plate 52 is disconnected from the tube 56 grid circuit by the relay as soon as condenser 84 is charged. Thus, if during a printing exposure or illumination of the enlarger lamp the push-button 43 is again depressed either inadvertently or intentionally, it will not modify the already started printing time. A new printing time cannot be started until the first time is completed, the lamp turned off, and the circuit restored by the relay 68.

While we have shown and described certain specific embodiments of our invention, these are to be understood to be illustrative only as it is capable of modification to meet differing conditions and requirements, and we contemplate such variations as come within the spirit and scope of the appended claims.

We claim:

1. Electronic timing apparatus for use in combination with a photographic enlarger having a movable head carrying a light source, electronic means for varying the time of periods of illumination by said light source, said means comprising a three element electronic tube, a condenser connected in the grid circuit of said tube, means for charging the condenser to bias the tube, a relay controlled by current flow through the tube, a variable resistor for controlling leakage of the condenser charge, said resistor being calibrated in units of time, means for charging the condenser and a second variable means for controlling the charging means, said second variable means being adapted for connection to the movable head and for variation of the charge in accordance with movement of the head and consequent effective illumination afforded by the head.

2. Electronic timing apparatus for use in combination with a photographic enlarger having a movable head carrying a light source, electronic means for varying the time of periods of illumination by said light source, said means comprising a three element electronic tube, a condenser connected in the grid circuit of said tube, means for charging the condenser to bias the tube, a relay controlled by current flow through the tube, a variable resistor for controlling leakage of the condenser charge, said resistor being calibrated in units of time, means for charging the condenser and a second variable means for controlling the charging means, said second variable means comprising a resistance and a movable contact, one of said elements of said second variable means being adapted for connection to a fixed portion of the enlarger and the other adapted to be connected to the movable head whereby the effective resistance is varied by movement of the head and the charge is dependent upon the position of the head.

ARMAND R. PAULET.
CHARLES R. WHEELER.

REFERENCES CITED

The following references are of record in the file of this patent:

UNITED STATES PATENTS

| Number | Name | Date |
|---|---|---|
| 1,235,635 | Hansch | Aug. 7, 1917 |
| 2,258,994 | Merriman | Oct. 14, 1941 |
| 2,293,425 | Dammond | Aug. 18, 1942 |
| 2,390,065 | Gelb | Dec. 4, 1945 |
| 2,389,087 | Schubert | Nov. 13, 1945 |

FOREIGN PATENTS

| Number | Country | Date |
|---|---|---|
| 610,146 | Germany | Mar. 4, 1935 |